June 30, 1970  D. A. BRISTOL  3,518,665
ROTOR DRIVE MECHANISM FOR TWO-POSITION
INDICATING INSTRUMENT
Filed July 17, 1968  3 Sheets-Sheet 1
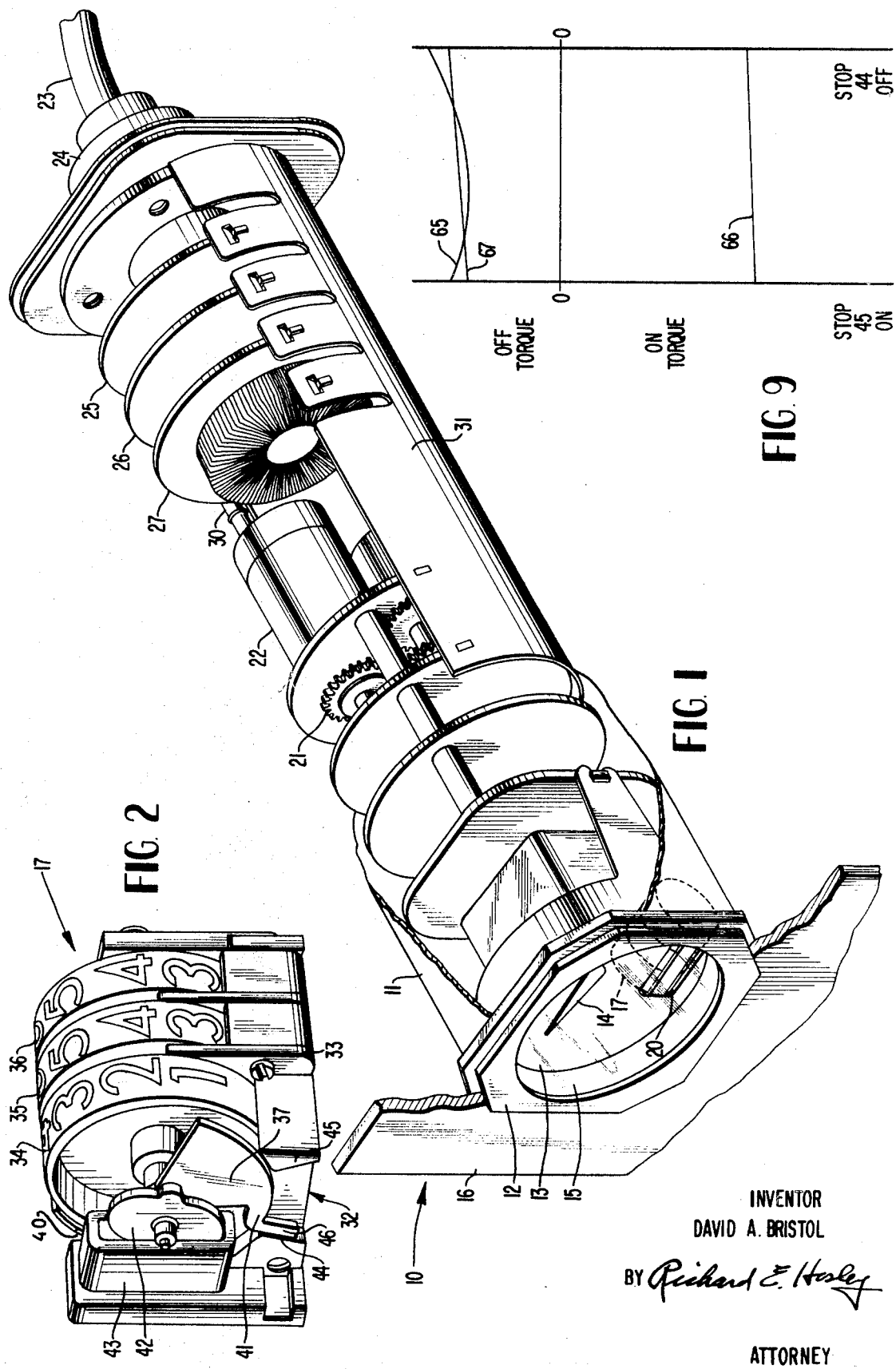
INVENTOR
DAVID A. BRISTOL
BY Richard E. Hosley
ATTORNEY June 30, 1970  
D. A. BRISTOL  
ROTOR DRIVE MECHANISM FOR TWO-POSITION  
INDICATING INSTRUMENT  
3,518,665
Filed July 17, 1968
3 Sheets-Sheet 2
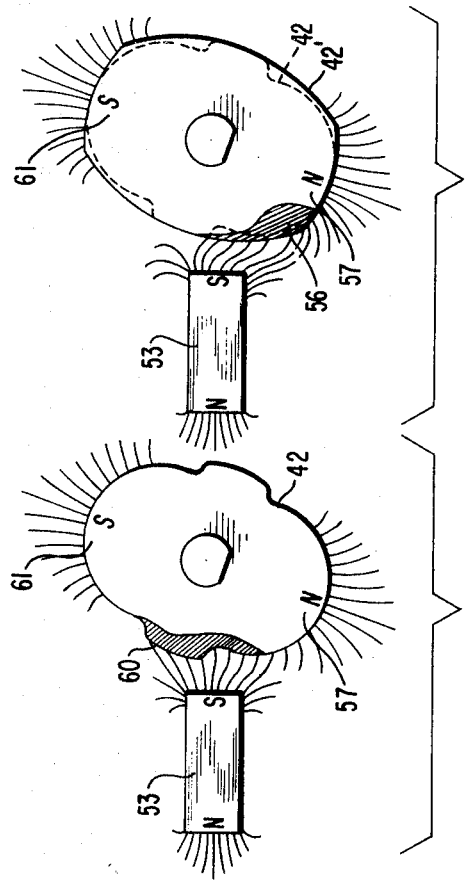
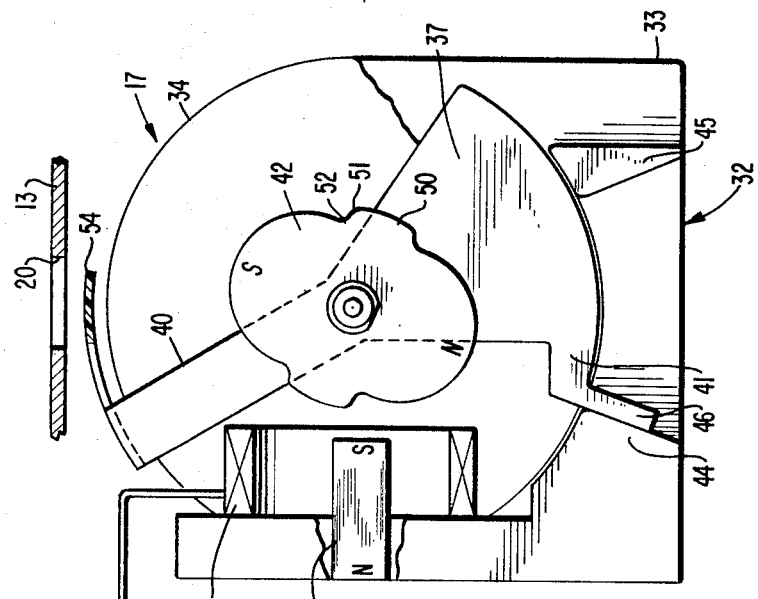
INVENTOR  
DAVID A. BRISTOL
BY *Richard E. Horley*
ATTORNEY

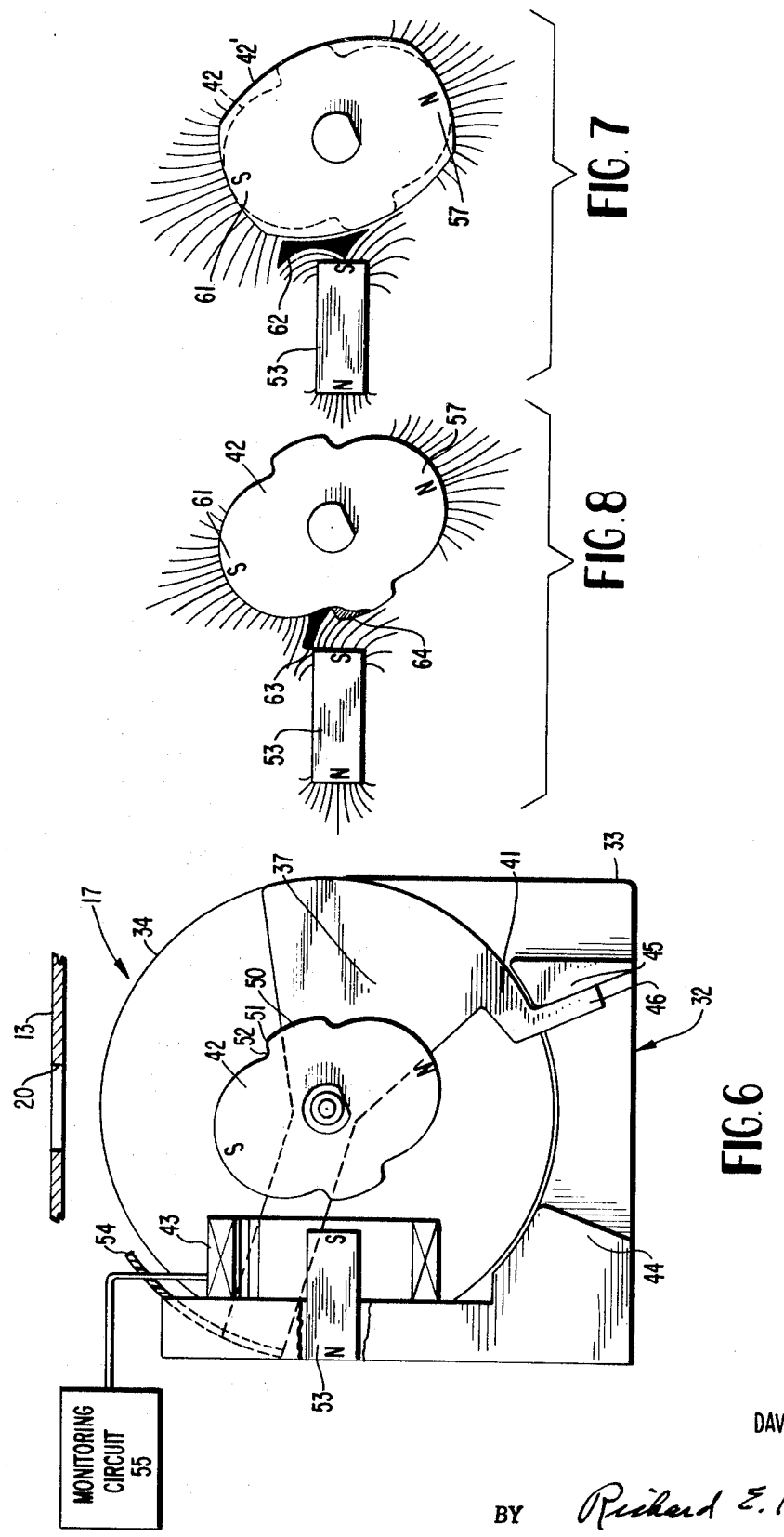

United States Patent Office 3,518,665
Patented June 30, 1970

3,518,665
ROTOR DRIVE MECHANISM FOR TWO-POSITION
INDICATING INSTRUMENT
David A. Bristol, Lynnfield, Mass., assignor to General
Electric Company, a corporation of New York
Filed July 17, 1968, Ser. No. 745,559
Int. Cl. G08b 5/14
U.S. Cl. 340—373                             2 Claims

ABSTRACT OF THE DISCLOSURE

A magnetic drive mechanism for an indicating device. A planar magnet is mounted for rotation to drive an indicating device between two positions. The magnet is elongated along its polar axis. Transverse extensions of the magnet are juxtaposed to a return magnet to obtain a substantially uniform rotor driving torque during rotation between the two positions.

BACKGROUND OF THE INVENTION

This invention is generally related to indicating instruments and more specifically to failure indicating means for such instruments.

Indicating instruments designed for highly reliable applications include means for detecting internal instrument failures such as power failures or other malfunctions which must be identified and displayed. One specific application where such display is necessary is found in aircraft indicating instruments.

In the prior art several on-off indicating arrangements have been evolved. The most compact of these has been an arrangement wherein a flag is mounted to rotate in close juxtaposition about a counter display so that a monitored failure causes the flag to drop in front of the visible counter portion. Various mechanisms have been developed for moving the flag and include both combinations of mechanical and magnetic devices and purely magnetic devices.

This invention is particularly adapted for use in the purely magnetic drive mechanisms. Generally, these mechanisms have included a spherically or disc shaped rotor with a magnet formed as a portion thereof, an electromagnetic coil and a permanent magnet. The coil produces a field which is larger in magnitude and opposite in polarity from the field produced by the permanent magnet. Therefore, the electromagnet coil acts as a driving mechanism; and the permanent magnet, a return means.

Rotor magnets which are peculiarly adapted for use in aircraft instruments have been constructed of anisotropic magnetic material to obtain a maximum torque with a minimum rotor volume. However, anisotropic materials are difficult to handle and are more expensive than isotropic magnetic materials. Isotropic magnets are usually difficult to use in rotors because the interaction of the rotor, the coil and the return magnet has produced an uneven torque distribution during travel of the rotor from one position to the other. Instrument reliability was reduced because the rotor could equilibrate between the two defined positions if there was a partial power failure.

Therefrom, it is an object of this invention to provide an improved rotor for a two-position indicating device with bistable operating characteristics.

Another object of this invention is to provide an improved rotor for a two-position indicating device which produces increased reliability and efficiency.

Still another object of this invention is to provide an improved rotor for a two-position indicating device which is adapted to be constructed of isotropic magnetic materials.

SUMMARY

In accordance with one aspect of this invention, a rotor is mounted on a shaft and affixed to the failure indicating mechanism. A coil and permanent magnet produce torques on the rotor which is elongated along the polar axis. Extensions are formed transversely to the polar axis so one extension is juxtaposed to the permanent magnet. Interaction of the coil, permanent magnet and rotor fields produces a substantially uniform torque on the rotor.

This invention has been pointed out with particularity in the appended claims. A more thorough and further appreciation of the objects and advantages of this invention may be attained by referring to the following detailed description taken in conjunction with the accompanying drawings.

BRIEF DESCRIPTION OF THE DRAWINGS

FIG. 1 illustrates an indicating instrument which incorporates this invention;

FIG. 2 is a perspective view of one embodiment of this invention;

FIG. 3 is a sectional view taken along lines 3—3 in FIG. 2 to illustrate details of the embodiment shown in FIG. 2;

FIG. 4 is a representation of certain interacting members of the prior art to be compared with FIG. 5;

FIG. 5 is a representation of certain interacting members of the embodiment shown in FIG. 3;

FIG. 6 is a sectional view similar to that shown in FIG. 3 at a second operation position;

FIG. 7 is a representation of certain interacting members of the prior art to be compared with FIG. 8;

FIG. 8 is a representation of certain interacting members of the embodiment shown in FIG. 6; and FIG. 9 graphically illustrates the effect of incorporating this embodiment of the invention in an indicating instrument.

DESCRIPTION OF AN ILLUSTRATIVE
EMBODIMENT

In the following discussion like numerals refer to like elements throughout. An instrument indicator generally designated by numeral 10 is shown in FIG. 1 with most of its housing 11 removed. Such an instrument generally includes a visible portion including a flange 12, a scale plate 13, an indicating pointer 14 and a transparent dial face 15 over the scale plate 13 and the indicating pointer 14. These elements constitute an indicating means which provides a reading when the indicating pointer 14 is driven along the scale plate 13 in response to a driving signal.

Means for providing the driving electrical signal are disposed behind a panel 16 within the housing 11. As means for driving the indicating pointer 14 and the particular circuitry and mechanical elements for such a system are known in the art, they are only shown in outline. The indicating pointer 14 and a counter 17, disposed behind the panel 16 and visible through an aperture 20 in the scale plate 13, are driven through a gear mechanism 21 by a servomotor 22. The servomotor 22 is driven in response to a sensor signal coupled to the indicating instrument 10 by means of a cable 23 which is attached to a connector assembly 24 and then coupled to an electronic circuit formed on a plurality of printed circuit boards 25, 26 and 27. Each circuit board is coupled to an adjacent board or to the connector assembly 23 by means of internal cables 30. Each of these printed circuit boards is maintained in a stacked, parallel relationship by a cradle assembly 31.

A failure warning device which achieves the aforementioned objects may be applied to the instrument shown in FIG. 1 in the form of a failure indicating assembly 32 which is adapted to cover the counter 17 in response to a failure to thereby substantially interfere with the counter reading. Details of such a counter assembly adapted to incorporate a failure indicating assembly 32 are shown in FIG. 2. The counter comprises a support 33 upon which three counter wheels 34, 35 and 36 are mounted for rotation. These wheels are conventionally driven by a gear assembly which is not shown but which is mounted to the support 33.

The failure indicating assembly 32 comprises an integral member 37 which includes a flag 40 and a stop 41. The integral member 37 is mounted for rotation about an axis through the counter 17 and is affixed to a rotor 42 formed of an isotropic magnetic material. An electromagnet coil 43 is also mounted to the support 33 to be partially coextensive with the rotor 42. Rotation of the integral member 37 and the rotor 42 is limited by engagement of the stop 41 with OFF and ON stop extensions 44 and 45 formed on the support 33. Although the main body of the stop 41 has an arcuate shape to balance the flag 40 and to clear the stop extensions 44 and 45, an integral depending portion 46 engages the stop extensions 44 and 45.

Referring to FIG. 3, the rotor 42 is generally elongated along the polar axis and has two extensions, 47 and 50, formed thereon which extend along an axis perpendicular to the polar axis. These extensions are formed with a small radius of curvature at the outer corners 51 thereof and a large radius of curvature at the inner corners 52. The extension 47 is juxtaposed to a permanent magnet 53 which is specifically shown with its south pole adjacent the rotor 42. The polarization of the electromagnetic coil 43 and the permanent magnet 53 are reversed. Further, the electromagnetic coil 43 produces a magnetic field of about twice that of the permanent magnet 53. When the electromagnetic coil 43 is de-energized, the permanent magnet 53 attracts the north pole and repels the south pole of the rotor 42 to position it as shown in FIG. 3. Additional rotation is prevented by engagement of the depending portion 46 with the OFF stop extension 44. An opaque area 54 of the flag 40 is oriented with the aperture 20 in the scale plate 13 to interfere with the counter reading.

If a monitoring circuit 55 associated with the indicating instrument energizes the electromagnetic coil 43 when no internal failures occur, the magnetic field acting on the rotor 42 is reversed. The south pole of the rotor is attracted and the north pole is repelled until the depending portion 46 engages the ON top extension 45. In this orientation, the opaque area 54 on the flag 40 is removed from the aperture 20 so no interference with the counter reading is encourntered.

To understand and appreciate the improved operation of the system illustrated in FIG. 2, the rotor is shown in two operating positions in FIGS. 3 and 6. In FIG. 3 the rotor 42 is against the OFF stop extension 44 while in FIG. 6 the rotor 42 is against the ON stop extension 45. The electromagnetic coil 43 produces a substantially uniform electromagnetic field across the rotor 42. For the limited rotation of the rotor 42, the torque remains substantially constant. However, the field produced by the permanent magnet 53 is not uniform across the rotor 42 so that local effects result. These local effects may cause faulty operation with an errant indication. Therefore, the operation of the improved rotor 42 and the rotor 42' constructed in accordance with the prior art are analyzed.

In FIG. 4 the rotor 42' constructed in accordance with the prior art is shown in the OFF position with the outline of the improved rotor 42 superimposed thereon. In this position, unlike poles of the rotor 42' and the permanent magnet 53 were juxtaposed. The resultant flux density between the rotor 42' and the permanent magnet 53 was increased so that the torque acting upon the rotor 42' reached one maximum at the OFF position. It was also found that the rotor 42' was magnetized in an area 56 adjacent the north pole 57 by the permanent magnet 53. As the resultant force acted along a line displaced from the center of the rotor, the rotor torque increased as the rotor 42' approached the position in FIG. 4.

When the rotor 42' in FIG. 4 is modified by removing portions outside the dashed line, the rotor 42, shown in FIG. 5, in produced. As previously described, each of the outer corners 51 has a small radius of curvature; each of the inner corners 52, a large radius of curvature. As the rotor 42 remains within the substantially uniform flux field produced by the electromagnetic coil 43, the rotor torque is not substantially affected. As the distance from the permanent magnet 53 to the adjacent edge of the rotor 42 between the transverse extension 47 and the north pole 57 is increased a new magnetized area exists. A new magnetized area 60 extends over an increased area to produce a new resultant force which acts on a new line more closely adjacent the center of rotor rotation. As a result, the net torque acting on the rotor 42 at the OFF stop extension 44 is reduced.

FIG. 6 illustrates the rotor 42 in position attained when the electromagnetic coil 43 is energized. The flag 40 is rotated away from the aperture 20 in the scale plate 13 to thereby provide an unobstructed view of the counter wheels represented by the wheel 34. This position is defined when the depending portion 46 engages the ON stop extension 45. When a rotor 42' constructed in accordance with the prior art and shown in FIG. 7 was utilized, a maximum torque also existed at the ON stop extension. In this orientation, like poles were juxtaposed so a strong repelling force was exerted on the rotor 42' between the permanent magnet 53 and the south pole 61. Normally this force acted in an area 62 through a moment arm to produce a maximum torque at the ON stop extension 45.

The aforementioned modification of the rotor 42' provides the construction shown in FIG. 8. Again the distance from the permanent magnet 53 to the edge of the rotor 42 between a south pole 61 and the transverse extension 47 is increased so that a new repelling force exists along a line which is more closely adjacent the center of rotor rotation. This force acted in the area shown by numeral 63. Further, some flux is linked toward the north pole 57 so an attractive force results. As a result, torque at the ON stop extension 45 is reduced.

In FIG. 9 graph 65 is the torque exerted by interaction of the prior art rotor and the permanent magnet. This is an OFF driving torque. As described hereinabove, a maximum torque area exists at each of the stop positions with the torque at the ON stop extension 45 being slightly less than that at the OFF stop extension 44. In actual practice it was found that the torque exerted on the rotor by the electromagnetic coil 43 varied substantially linearly to a maximum at the ON stop extension 45. This torque is represented by the graph 66 and is the ON driving torque.

Assuming that the rotor 42 in FIG. 4 was in the OFF position, it would be necessary to increase the ON driving torque above the OFF stop maximum torque. Once this torque was exceeded, the rotor would accelerate to mid-stroke. Thereafter, the total rotor torque would decrease. If the rotor were in the ON position and the electromagnetic coil energization level decreased so that it was less in magnitude than the maximum stop torque but greater than the minimum, the rotor could reach an equilibrium position between the stop positions. Such an ambiguous reading could be produced by a voltage drop so a well regulated power supply was required in the prior art.

In accordance with this invention, the OFF driving torque produced by interaction of the rotor and permanent magnet is modified and is represented by graph 67 in FIG. 9. Comparison of the graphs 66 and 67 indicates the improved performance and the bistable nature of the indicator illustrated in FIG. 2. When the electromagnetic field is raised to exceed the reduced maximum rotor torque produced by the permanent magnet plus any frictional forces, the rotor is displaced. As the rotor moves toward the ON stop, the torque component caused by the permanent magnet decreases while the electromagnetically produced torque increases slightly. Therefore, the rotor is accelerated with an increasing torque to the ON stop position. If voltage drop reduces the electromagnetically produced torque, the rotor does not move until the torque drops below the permanent magnet torque. As the rotor moves to the OFF stop position, the electromagnetically produced torque decreases while the permanent magnet field increases. Again, the rotor is accelerated with an increasing torque to the OFF stop position. Therefore, in accordance with this invention, a failure warning device has been provided with an improved rotor which assures reliable bistable operation. The efficiency of the system is increased because additional power is not necessary even though isotropic magnetic materials are utilized. Further, there is no loss in reliability. While this invention has been described in reference to a particular embodiment designed for a particular application, it will be obvious to those of ordinary skill in the art that many changes and modifications may be effected with the specific elements of this invention. For example, different torque relationships may be achieved by altering the curvature of the corners of the rotor extensions. Therefore, it is the object of the appended claims to cover all such modifications and variations as come within the true spirit and scope of this invention.

What is claimed as new and desired to be secured by Letters Patent of the United States is:

1. A two-condition indicator comprising:
   (a) a support means,
   (b) means for producing a selectably reversible magnetic field along a first polar axis,
   (c) indicating means mounted to said support means for rotation between two positions, and
   (d) a planar permanent magnet drivingly connected to said indicating means and elongated on a polar axis thereof, the magnetic field and the permanent magnet polar axes being substantially perpendicular, said magnet having oppositely projecting extensions transverse to the magnet polar axis, said magnet and said reversible magnetic field producing means being mounted to said support means so one of said extensions is juxtaposed to said magnetic field producing means whereby bistable operation of the indicating means is obtained.

2. A two-condition indicator as recited in claim 1 wherein said magnetic member is formed of an isotropic material.

References Cited

UNITED STATES PATENTS 2,555,791  6/1951  Everett _____ 340—373 X

HAROLD I. PITTS, Primary Examiner

U.S. Cl. X.R.

340—366, 378